US009759567B2

(12) United States Patent
Sato et al.

(10) Patent No.: US 9,759,567 B2
(45) Date of Patent: Sep. 12, 2017

(54) POSITION CALCULATION METHOD AND POSITION CALCULATION DEVICE

(71) Applicant: Seiko Epson Corporation, Tokyo (JP)

(72) Inventors: Akinobu Sato, Fujimi-machi (JP); Anand Kumar, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/811,323

(22) Filed: Jul. 28, 2015

(65) Prior Publication Data

US 2016/0033279 A1    Feb. 4, 2016

(30) Foreign Application Priority Data

Jul. 31, 2014  (JP) ................................. 2014-156115

(51) Int. Cl.
  *G01C 21/10*    (2006.01)
  *G01C 21/16*    (2006.01)
  *G01C 22/00*    (2006.01)

(52) U.S. Cl.
  CPC ........... *G01C 21/16* (2013.01); *G01C 22/006* (2013.01)

(58) Field of Classification Search
  None
  See application file for complete search history.

(56) References Cited

U.S. PATENT DOCUMENTS

| 8,510,044 | B2* | 8/2013 | Watanabe | G01C 21/165 701/472 |
| 2001/0019963 | A1 | 9/2001 | Nakada et al. | |
| 2006/0112754 | A1* | 6/2006 | Yamamoto | A61B 5/1116 73/1.38 |
| 2007/0038268 | A1* | 2/2007 | Weinberg | A61H 3/00 607/62 |
| 2007/0276590 | A1* | 11/2007 | Leonard | G01C 21/005 701/468 |
| 2008/0294342 | A1* | 11/2008 | Hoshizaki | G01C 21/165 701/472 |
| 2009/0018772 | A1* | 1/2009 | Watanabe | G01C 21/165 701/472 |
| 2010/0019963 | A1* | 1/2010 | Gao | G01S 5/0027 342/357.31 |
| 2013/0338915 | A1* | 12/2013 | Mizuochi | G01C 21/16 701/500 |
| 2014/0106775 | A1* | 4/2014 | Mizuochi | G01S 19/47 455/456.1 |

(Continued)

FOREIGN PATENT DOCUMENTS

| JP | 2012-194715 A | 10/2012 |
| JP | 2012194175 A | * 10/2012 ............. G01C 21/16 |

*Primary Examiner* — Nicholas Kiswanto
*Assistant Examiner* — Kenny A Taveras
(74) *Attorney, Agent, or Firm* — Kilpatrick Townsend & Stockton LLP

(57) ABSTRACT

A position calculation device includes an acceleration sensor and a gyro sensor to detect a movement of the user which is mounted on the body of the user, an arithmetic processing unit which executes setting a traveling direction axis by using a detection result of the sensor, using a change in a traveling direction of the user and correcting the traveling direction axis, and calculating a position based on the detection result of the sensor by using predetermined constraint condition based on the traveling direction axis.

4 Claims, 9 Drawing Sheets

(56) References Cited

U.S. PATENT DOCUMENTS

| | | | |
|---|---|---|---|
| 2014/0335893 A1* | 11/2014 | Ronen | G01S 5/0252 455/456.1 |
| 2015/0330791 A1* | 11/2015 | Matsushita | G01C 21/206 702/150 |
| 2015/0354967 A1* | 12/2015 | Matsushita | G01C 21/16 702/150 |
| 2016/0030823 A1* | 2/2016 | Sato | G06K 9/00342 434/255 |
| 2016/0033279 A1* | 2/2016 | Sato | G01C 22/006 701/510 |
| 2016/0058329 A1* | 3/2016 | Srinivas | A61B 5/0205 600/595 |
| 2016/0146610 A1* | 5/2016 | Sato | G01C 21/16 701/500 |

\* cited by examiner

POSITION CALCULATION METHOD AND POSITION CALCULATION DEVICE

BACKGROUND

1. Technical Field

The present invention relates to a position calculation method or the like which calculates the position of a user.

2. Related Art

From the related art, for example, a technology has been known in which inertial navigation arithmetic is performed by using a measurement result of a sensor such as an acceleration sensor or a gyro sensor, and the position of a movable body or the like is calculated. For example, a technology of JP-A-2012-194175 has been known in which an automobile is assumed as the movable body. In JP-A-2012-194175, an attachment posture of the sensor with respect to the movable body is determined by using a velocity vector obtained from the measurement result of the sensor, an inertial navigation arithmetic result is corrected by applying a Kalman filter, and thus position calculation of the movable body is performed.

However, the position calculation of JP-A-2012-194175 is premised on a fact that the velocity vector is a traveling direction axis of the movable body. However, when the movable body is a person, the direction of a body is changed with respect to a traveling direction according to movement such as walking or running. Specifically, the person inconsistently turns body portions including the lower back to the left and the right in order to extend legs in the order of left and then right at the time of walking or running. That is, the orientation the body portion swings from left to right while walking or the like, and is periodically changed with respect to the traveling direction, and thus the direction of the velocity vector varies with respect to the traveling direction in which the user moves in reality. For example, when the person is assumed as the movable body, and the position calculation is performed by mounting the sensor on the body of the user (the body portion), in the method of JP-A-2012-194175, it is difficult to accurately perform the position calculation.

SUMMARY

An advantage of some aspects of the invention is to accurately calculate the position of a user from a detection result of a sensor mounted on a body portion of the user.

A first aspect of the invention is directed to a position calculation method including: setting a traveling direction axis by using a detection result of a sensor which detects a movement of a user which is mounted on the user; using a change in a traveling direction of the user and correcting the traveling direction axis; and calculating a position by using predetermined constraint condition, based on the traveling direction axis and by using the detection result of the sensor.

As another aspect of the invention, the invention may be configured as a position calculation device including a sensor which detects a movement of a user which is mounted on the user; and an arithmetic processing unit which executes setting a traveling direction axis by using a detection result of the sensor, using a change in a traveling direction of the user and correcting the traveling direction axis, and calculating a position based on the detection result of the sensor by using predetermined constraint condition based on the traveling direction axis.

According to the first aspect and the like of the invention, it is possible to set the traveling direction axis by using the detection result of the sensor mounted on the user, and to calculate the position by using the constraint condition based on the traveling direction axis while correcting the traveling direction axis by using the change in the traveling direction of the user. Therefore, it is possible to accurately calculate the position of the user.

A second aspect of the invention is directed to the position calculation method according to the first aspect of the invention, wherein the correcting includes estimating a change amount in the traveling direction of the user from the set traveling direction axis.

According to the second aspect of the invention, it is possible to correct the traveling direction axis by estimating the amount of change that occurs in the traveling direction of the user from the traveling direction axis at the time of initial setting, and thus it is possible to suitably correct the traveling direction axis without affecting a change in a yaw angle of a body portion of the user according to walking or running.

A third aspect of the invention is directed to the position calculation method according to the second aspect of the invention, wherein an acceleration sensor and a gyro sensor are included in the sensor, and the estimating includes performing correction by using a Kalman filter in which the change amount in the traveling direction is set as an element of a state vector and a change in a yaw angle based on the detection result of the gyro sensor is set as an element of an observation vector.

According to the third aspect of the invention, it is possible to estimate the change amount of travelling direction by using a Kalman filter in which the change amount in the traveling direction is set as an element of a state vector and a change in a yaw angle based on the detection result of the gyro sensor is set as an element of an observation vector.

A fourth aspect of the invention is directed to the position calculation method according to any of the first to third aspects of the invention, wherein the calculating of the position includes correcting the position by using movement limitation to a direction other than a direction along the traveling direction axis as the constraint condition.

According to the fourth aspect of the invention, it is possible to correct a calculation position by using the constraint condition limiting the movement to the direction other than the direction along the traveling direction axis, and thus it is possible to reduce an error due to the change in the yaw angle of the body portion of the user according to walking or running at the time of the position calculation.

A fifth aspect of the invention is directed to the position calculation method according to the fourth aspect of the invention, wherein the correcting of the position includes performing correction by using a Kalman filter in which an error in the position change is set as an element of a state vector and a position change component to the direction other than the traveling direction axis is set as an element of an observation vector.

According to the fifth aspect of the invention, it is possible to correct the position by using a Kalman filter in which an error in the position change is set as an element of a state vector and a position change component to the direction other than the traveling direction axis is set as an element of an observation vector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
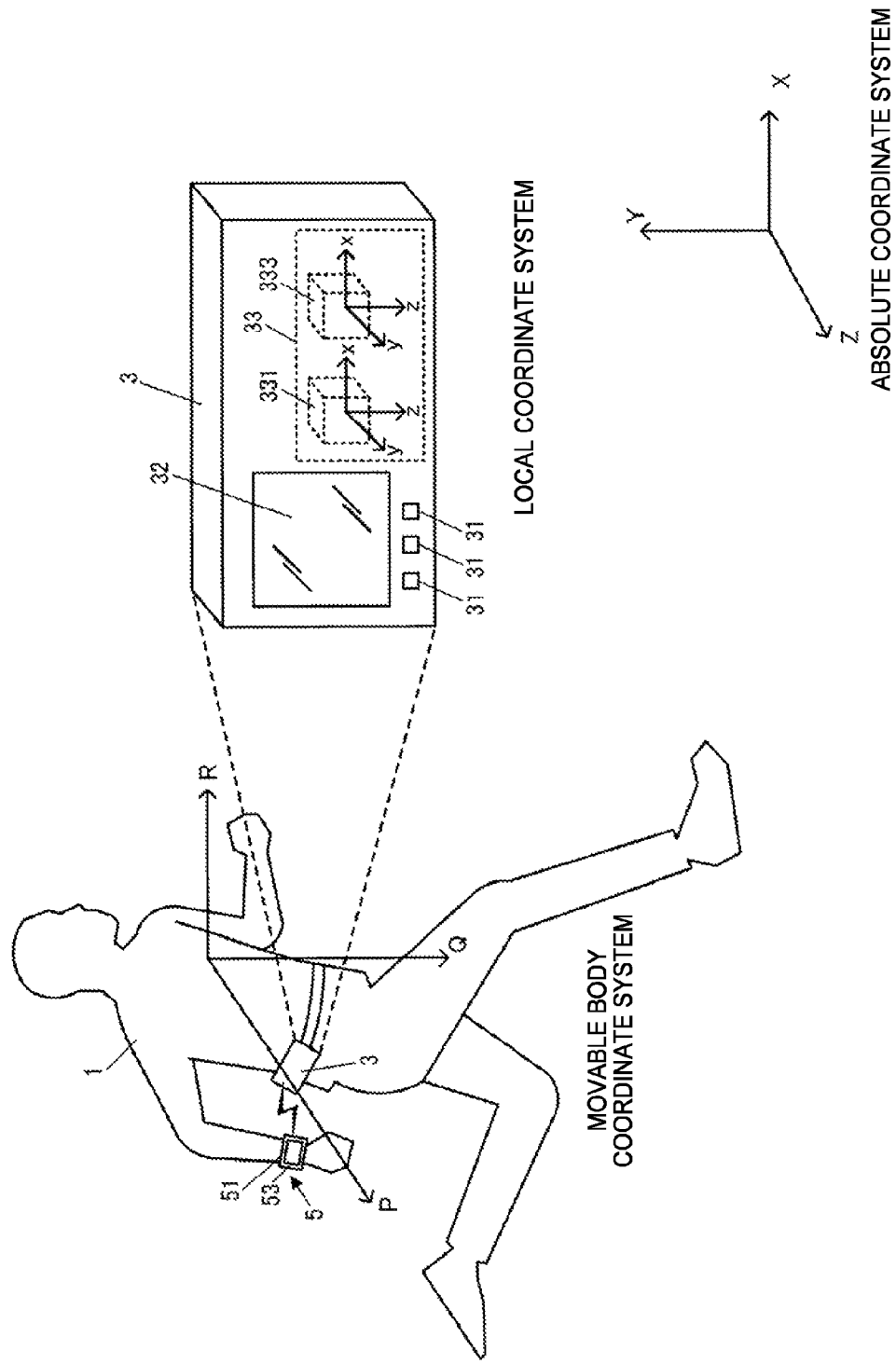
FIG. 1 is a schematic view illustrating a system configuration example of an entire system including a position calculation device.

Hereinafter, an aspect for performing a position calculation method and a position calculation device according to the invention will be described with reference to the drawings. Furthermore, the invention is not limited by an embodiment described later, and the embodiment to which the invention is able to be applied is not limited to the following embodiment. In addition, in the drawings, the same reference numerals are applied to the same parts.

FIG. 1 is a schematic view illustrating a system configuration example of an entire system including a position calculation device 3 of this embodiment. The position calculation device 3 is a compact electronic device which is carried and used by a user 1 in walking or running along with a separate display device 5. Furthermore, the user 1 determines whether or not to use the display device 5, and this embodiment is able to be realized by a single body of the position calculation device 3 without using the display device 5. The position calculation device 3 and the display device 5 are configured to transmit and receive data of wireless communication, and for example, as illustrated in FIG. 1, the position calculation device 3 is mounted on a body portion of the user 1 (for example, a right lower back or a left lower back), and the display device 5 is mounted on arms of the user 1 (a right arm or a left arm).

The position calculation device 3 suitably includes a button switch 31 or a display 32 disposed on a front surface of a housing or the like, and includes an IMU 33 which is known as an inertia measurement unit mounted thereon. The IMU 33 includes an acceleration sensor 331, and a gyro sensor 333.

Here, in this embodiment, three types of coordinate systems are defined. A first coordinate system is a local coordinate system which is a three-dimensional orthogonal coordinate system (a sensor coordinate system) associated with each of sensors 331 and 333 of the IMU 33. The IMU 33 detects acceleration of each axis direction of the local coordinate system and an angular velocity around each axis by the acceleration sensor 331 and the gyro sensor 333. Herein, three axes of the local coordinate system are indicated as an x axis, a y axis, and a z axis.

A second coordinate system is a three-dimensional orthogonal coordinate system (a movable body coordinate system) associated with the user 1 which is a movable body. Herein, in the movable body coordinate system, a front-back direction in which a traveling direction of the user 1 (a front direction) is positive is a roll axis (an R axis), a left and right direction in which a right direction is positive is a pitch axis (a P axis), an up and down direction in which a vertically lower direction is positive is a yaw axis (a Q axis).

A third coordinate system is a three-dimensional orthogonal coordinate system (an absolute coordinate system) which is a coordinate system for determining a movement space of the movable body. Herein, three axes of the absolute coordinate system are indicated as an X axis, a Y axis, and a Z axis. The absolute coordinate system, for example, is defined as North East Down (NED) coordinate system and an Earth Centered Earth Fixed (ECEF) coordinate system.

The acceleration or the velocity of the user 1 has a direction and a magnitude. For example, herein, a scalar and a vector will be suitably separately described. In principle, the acceleration or the velocity indicates the magnitude (a scalar amount) of acceleration or velocity, and an acceleration vector or a velocity vector indicates acceleration and velocity in consideration of direction and magnitude.

Furthermore, in order to make various amounts defined in each of the coordinate systems obvious, the various amounts will be described by applying the type of coordinate system to the beginning of the term indicating each of the various amounts. For example, the acceleration vector indicated by the local coordinate system is referred to as a "local coordinate acceleration vector", and the acceleration vector indicated by the absolute coordinate system is referred to as an "absolute coordinate acceleration vector". The same will be applied to the other various amounts.

In addition, the posture of the sensors 331 and 333 are indicated by a Euler angle such as a roll angle, a pitch angle, and a yaw angle. Hereinafter, the direction of the sensors 331 and 333 indicated by the absolute coordinate system is indicated by an "absolute posture", and a posture angle thereof is referred to as an "absolute posture angle". In addition, the relative posture of the sensors 331 and 333 with respect to the user 1 is referred to as a "sensor posture", and a posture angle (a relative posture angle) thereof is referred to as a "sensor posture angle".

Here, a relationship between the local coordinate system and the movable body coordinate system will be described. When it is assumed that a velocity component of the user 1 in every direction (an up and down direction and a leftward and rightward direction) while moving is zero by assuming normal walking or the like, the traveling direction of the user 1 is able to be defined by using the velocity vector, and it is possible to grasp the sensor posture by obtaining a coordinate conversion matrix to the movable body coordinate system from the local coordinate system. However, as described above, the orientation of the body portion swings from left to right while walking or the like, and thus when the traveling direction is captured by using the velocity vector, the traveling direction varies according to a periodical change in the yaw angle.

Figure 2:
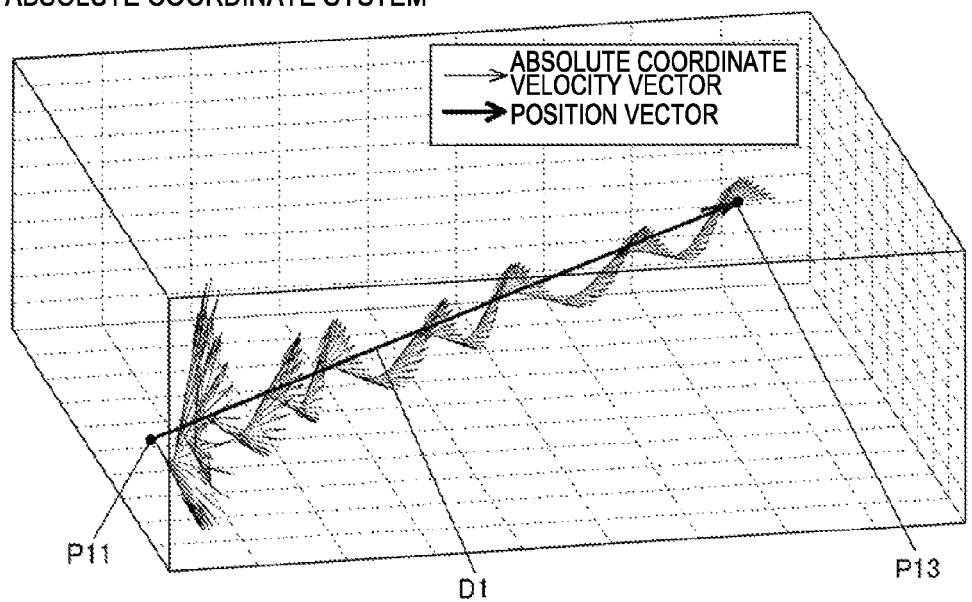
FIG. 2 is a diagram illustrating an example of a change in an absolute coordinate velocity vector of a user while moving.

FIG. 2 is a diagram illustrating an example of a change in the velocity vector (an absolute coordinate velocity vector) of the absolute coordinate system of the user 1 while moving. As illustrated in FIG. 2, the absolute coordinate velocity vector of the user 1 while moving from a spot P11 to a spot P13 considerably varies with respect to a real traveling direction D1 of the user 1 indicated by a position vector from the spot P11 to the spot P13. Therefore, in order to suitably define the traveling direction of the user 1 by using the velocity vector, it is necessary to extract the velocity vector when the body portion of the user 1 is directed towards a front surface, and thus it is difficult to realistically define the traveling direction.

Therefore, in this embodiment, the position vector is calculated to be an initial traveling direction at a movement start initial stage in which the user 1 has started to move, and a traveling direction axis is initially set. Then, the amount of change that occurs in the traveling direction of the user 1 from the traveling direction axis at the time of initial setting (the amount of change that occurs in the traveling direction from the initial traveling direction) is estimated by using the amount of change that occurs in the yaw angle of the user 1, and an absolute coordinate position or a movement velocity, a running distance, and the like are calculated while correcting the traveling direction axis. Then, the position calculation device 3 transmits the calculated absolute coordinate position of the user 1 or the like to the display device 5.

The display device 5 is a wrist watch type electronic device which receives and displays the absolute coordinate position of the user 1 or the like transmitted from the position calculation device 3, and includes a display unit 53 which is disposed on a front surface of a main body case 51 (a surface which is in an outer direction when the user 1 is mounted). In addition, even though it is not illustrated, the display device 5 suitably includes a button switch or a speaker which is disposed on a suitable place of the main body case 51, a touch panel which is formed by being integrated with a display screen of the display unit 53, and the like.

Functional Configuration

Figure 3:
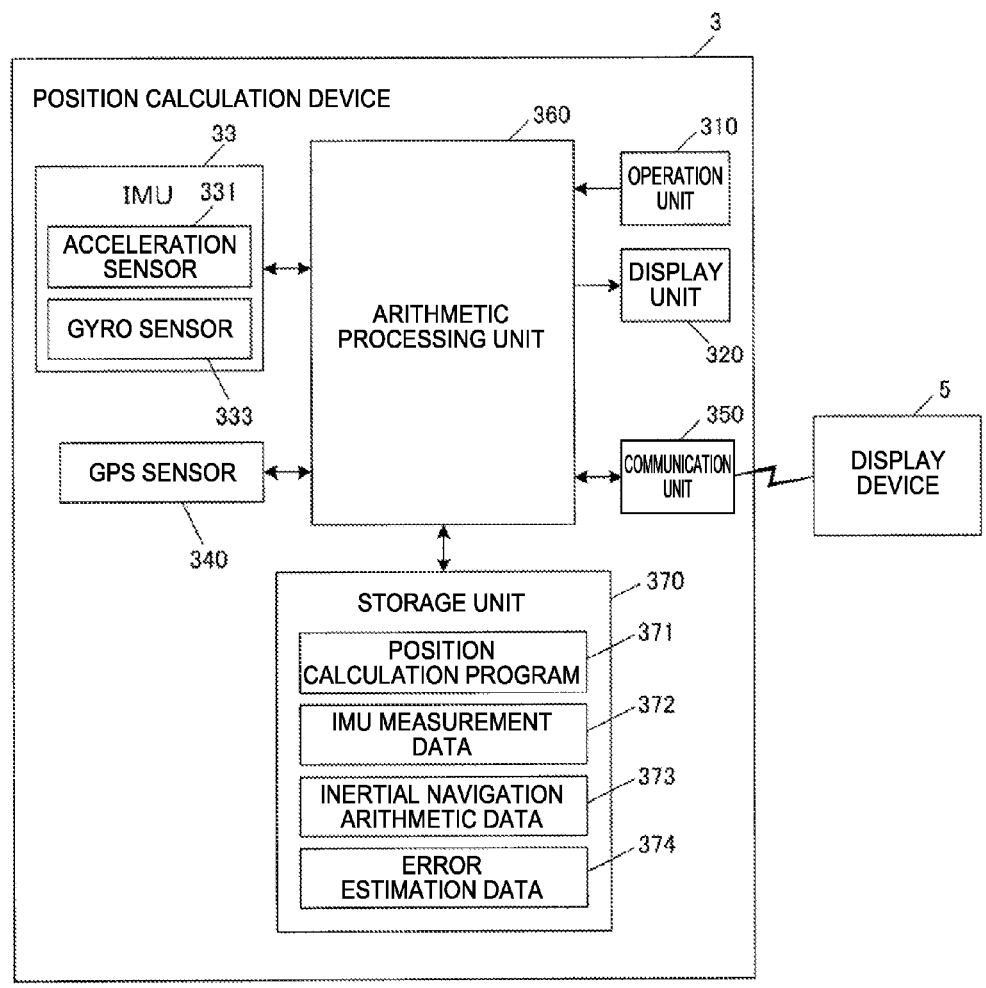
FIG. 3 is a block diagram illustrating an example of a functional configuration of the position calculation device.
Figure 4:
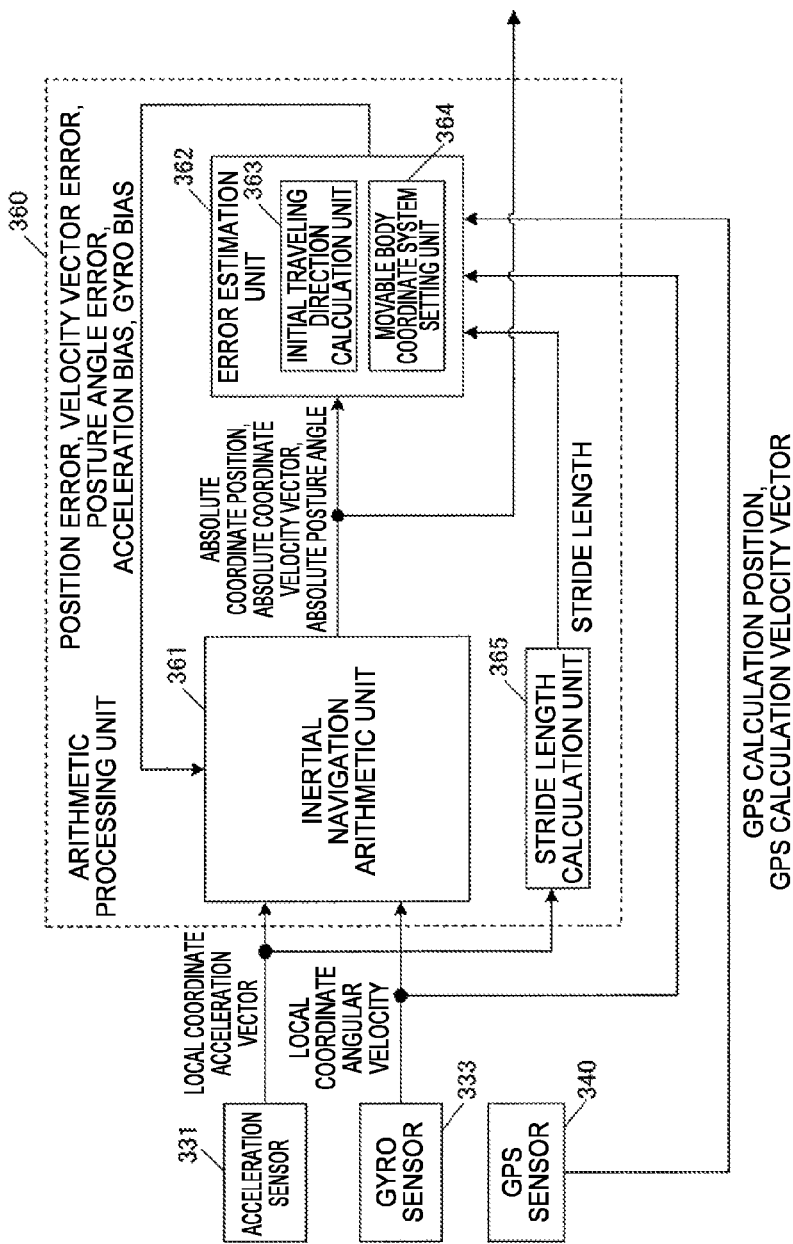
FIG. 4 is a block diagram based on a functional block of a processing unit of the position calculation device.

FIG. 3 is a block diagram illustrating an example of a functional configuration of the position calculation device 3. In addition, FIG. 4 is a block diagram mainly illustrating a functional block of an arithmetic processing unit 360 which configures the position calculation device 3. As illustrated in FIG. 3, the position calculation device 3 includes an operation unit 310, a display unit 320, the IMU 33, a GPS sensor 340, a communication unit 350, the arithmetic processing unit 360, and a storage unit 370.

The operation unit 310 is realized by various switches such as a button switch, a lever switch, and a dial switch, and an input device such as a touch panel, and an operation signal according to an operation input is output to the arithmetic processing unit 360. In FIG. 1, the button switch 31 corresponds to the operation unit 310.

The display unit 320 is realized by a display device such as a Liquid Crystal Display (LCD) or an Electroluminescence display (EL display), and displays various screens on the basis of a display signal input from the arithmetic processing unit 360. In FIG. 1, the display 32 corresponds to the display unit 320.

The IMU 33 includes the acceleration sensor 331 which measures the acceleration by the local coordinate system, and the gyro sensor 333 which measures the angular velocity by the local coordinate system similar to the acceleration sensor 331. In the sensors 331 and 333, for example, a MEMS sensor using a technology of Micro Electro Mechanical Systems (MEMS) is used.

The GPS sensor 340 is a sensor which receives a GPS satellite signal transmitted from a GPS satellite which is one type of a positioning satellite, and calculates the position and the velocity vector of the user 1 by using the received GPS satellite signal. The GPS sensor 340 calculates the position and the velocity vector (a velocity and an azimuth direction) of the user 1 in the absolute coordinate system, and outputs the position and the velocity vector to an error estimation unit 362 as a GPS calculation position and a GPS calculation velocity vector. Furthermore, a method of calculating the position or the velocity vector by using a GPS is known in the related art, and thus the detailed description thereof will be omitted. In addition, the position or the velocity vector may be calculated, not by using the GPS, but by using other satellite positioning systems such as Galileo, GLONASS, septentrion, and the like.

The communication unit 350 is a communication device for performing wirelessly connection to an external device by using wireless communication. In this embodiment, the absolute coordinate position of the user 1 or the like is occasionally transmitted to the display device 5 through the communication unit 350, and is displayed on the display unit 53 (refer to FIG. 1). Accordingly, the user 1 is able to run while easily confirming their position.

The arithmetic processing unit 360 is realized by a microprocessor such as a Central Processing Unit (CPU) or a Digital Signal Processor (DSP), a control device such as an Application Specific Integrated Circuit (ASIC), and an arithmetic device, and as illustrated in FIG. 4, includes an inertial navigation arithmetic unit 361, and error estimation unit 362, and a stride length calculation unit 365.

The inertial navigation arithmetic unit 361 performs inertial navigation arithmetic processing by using a local coordinate acceleration vector input from the acceleration sensor 331 and a local coordinate angular velocity input from the gyro sensor 333, and calculates the position (an absolute coordinate position), the velocity vector (an absolute coordinate velocity vector), and the posture angle (an absolute posture angle) of the user 1 in the absolute coordinate system. In addition, at this time, the inertial navigation arithmetic unit 361 corrects the local coordinate acceleration vector and the local coordinate angular velocity by using an acceleration bias and a gyro bias input from the error estimation unit 362, and then calculates the absolute coordinate position, the absolute coordinate velocity vector, and the absolute posture angle. Then, the inertial navigation arithmetic unit 361 corrects the absolute coordinate position, the absolute coordinate velocity vector, and the absolute posture angle by using a position error, a velocity vector error, and a posture angle error which are input from the error estimation unit 362. The obtained absolute coordinate position, absolute coordinate velocity vector, and absolute posture angle are output to the error estimation unit 362.

The error estimation unit 362 performs processing (error estimation processing) of estimating the amount of change that occurs in the traveling direction from an initial traveling direction error and the initial traveling direction (hereinafter, simply referred to as the "amount of change that occurs in the traveling direction"), and an error (hereinafter, referred to as an "inertial navigation arithmetic error") included in an inertial navigation arithmetic result (the absolute coordinate position, the absolute coordinate velocity vector, and the absolute posture angle) input from the inertial navigation arithmetic unit 361 by predetermined error estimation arithmetic. The error estimation unit 362 includes an initial traveling direction calculation unit 363, and a movable body coordinate system setting unit 364.

The error estimation unit 362 feedback outputs the estimated inertial navigation arithmetic error to the inertial navigation arithmetic unit 361. In this embodiment, an error in the absolute coordinate position (the position error), an error in the absolute coordinate velocity vector (the velocity vector error), and error in the absolute posture angle (the posture angle error), the acceleration bias, and the gyro bias are included in the inertial navigation arithmetic error.

As an estimation method of the inertial navigation arithmetic error, various methods are able to be applied, and a typical method is able to be realized by error estimation arithmetic (hereinafter, referred to as "KF error estimation arithmetic") to which a Kalman filter (hereinafter, indicated by a "KF (Kalman Filter)") is applied. Furthermore, as other methods, a method is included to which a filter such as an expanded Kalman filter or an unscented Kalman filter, a particle filter, and an H ∞ filter is able to be applied.

The stride length calculation unit 365 calculates a stride length which is used in the error estimation processing by the error estimation unit 362, that is, the length of one step of the user. Specifically, for example, a method is able to be applied in which the stride length is presumptively calculated from an amplitude value in a predetermined direction of the local coordinate acceleration vector (for example, a vertical direction).

The storage unit 370 is realized by various Integrated Circuit (IC) memories such as a Read Only Memory (ROM) or a flash ROM, and a Random Access Memory (RAM), or a storage medium such as hard disk. In the storage unit 370, a program for realizing various functions included in the position calculation device 3 by operating the position calculation device 3, data used for executing the program, and the like are stored in advance, or are temporarily stored during each processing.

In the storage unit 370, a position calculation program 371 for allowing the arithmetic processing unit 360 to function as the inertial navigation arithmetic unit 361, the error estimation unit 362, and the stride length calculation unit 365, and for performing position calculation processing (refer to FIG. 5) is stored.

In addition, in the storage unit 370, IMU measurement data 372, inertial navigation arithmetic data 373, and error estimation data 374 are stored. In addition, data such as data of the coordinate conversion matrix which is calculated or is used in the position calculation processing is suitably stored.

The IMU measurement data 372 is data of a measurement result of the IMU 33, and in the IMU measurement data 372, the local coordinate acceleration vector measured by the acceleration sensor 331 and the local coordinate angular velocity measured by the gyro sensor 333 are stored in chronological order. The inertial navigation arithmetic data 373 is data of an inertial navigation arithmetic processing result, and in the inertial navigation arithmetic data 373, each value of the absolute coordinate position, the absolute coordinate velocity vector, and the absolute posture angle is stored in chronological order. The error estimation data 374 is data of an error estimation processing result, and in the error estimation data 374, each value of the initial traveling direction error, the amount of change that occurs in the traveling direction, and the inertial navigation arithmetic error is stored in chronological order.

Processing Flow

FIG. 4 is a flowchart illustrating a procedure of the position calculation processing. The position calculation processing is able to be realized by reading and executing the position calculation program 371 from the storage unit 370 by the arithmetic processing unit 360.

As illustrated in FIG. 4, in the position calculation processing, first, the inertial navigation arithmetic unit 361 starts inertial navigation arithmetic processing (Step S1). Here, the inertial navigation arithmetic processing that is started is known in the related art, and thus the detailed description will be omitted, but when the procedure is simply described, first, the local coordinate angular velocity is integrated and is subjected to additional processing, and thus the absolute posture angle is calculated. Specifically, a change in a posture angle from a predetermined reference posture indicated by the absolute coordinate system is calculated by integrating the local coordinate angular velocity. Here, "integrating" indicates that the value of a predetermined unit time is cumulatively added. In addition, "additional" indicates that a result obtained by the integration is added to a result of final calculation.

In addition, a coordinate conversion matrix (an LA coordinate conversion matrix) from the local coordinate system to the absolute coordinate system is calculated by using the absolute posture angle, and the local coordinate acceleration vector is subjected to coordinate conversion to the absolute coordinate acceleration vector. Then, the absolute coordinate acceleration vector is integrated and is subjected to the additional processing, and the absolute coordinate velocity vector is calculated. That is, the absolute coordinate acceleration vector of a unit time is integrated, and thus a change in the velocity vector of the user 1 during the unit time is calculated, and the change is added to a finally updated absolute coordinate velocity vector, and thus the absolute coordinate velocity vector is newly calculated.

In addition, the absolute coordinate velocity vector is integrated and is subjected to the additional processing, and the absolute coordinate position is calculated. That is, a position change in the unit time is calculated by integrating the absolute coordinate velocity vector of the unit time, and the change is added to a finally updated absolute coordinate position, and thus the absolute coordinate position is newly calculated.

Subsequently, the stride length calculation unit 365 starts stride length calculation processing (Step S3). Here, in the stride length calculation processing that is started, the stride length calculation unit 365, for example, calculates a movement distance (the stride length; the length of one step) of one step by using a model in which a relationship between the amplitude of the acceleration and the length of one step is determined, on the basis of the local coordinate acceleration vector.

Figure 6:
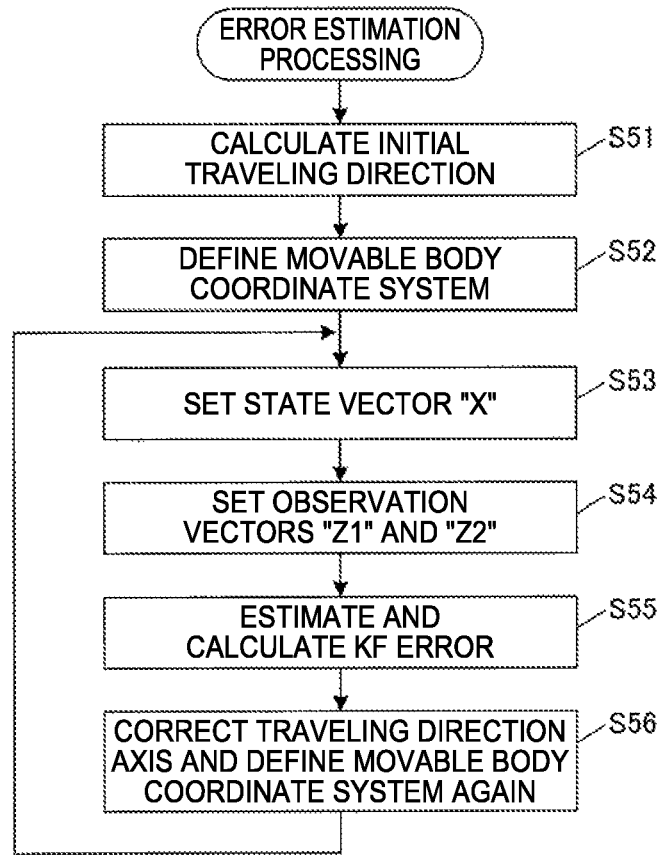
FIG. 6 is a flowchart illustrating a procedure of error estimation processing.

Then, the error estimation unit 362 starts the error estimation processing (Step S5). FIG. 6 is a flowchart illustrating a specific procedure of the error estimation processing.

As illustrated in FIG. 6, in the error estimation processing, first, the initial traveling direction calculation unit 363 calculates the initial traveling direction (Step S51). Specifically, the initial traveling direction calculation unit 363 calculates, for example, the position vector to the absolute coordinate position after a predetermined period of time which is set as a time period after a few steps as the initial traveling direction from the absolute coordinate position at the time of starting the movement. Subsequently, the movable body coordinate system setting unit 364 sets the initial traveling direction as the traveling direction axis, and sets a Z axis direction of the absolute coordinate system (alternatively, the direction of gravitational acceleration detected by the acceleration sensor 331 when the user 1 is in a state of being stopped) as the up and down direction, and thus the movable body coordinate system is defined (Step S52).

Then, as described above, the traveling direction axis is initially set, and the movable body coordinate system is defined, and then the error estimation unit 362 sets a state vector "X" denoted by the following expression (1) (Step S53). In the following expression (1), ΔV is the velocity vector error, ΔA is the posture angle error, $b_a$ is the acceleration bias, $b_g$ is the gyro bias, $\Delta\psi$ is the initial traveling direction error, $\Delta\psi^{MV}$ is the amount of change that occurs in the traveling direction from the initial traveling direction, and ΔR is the position error. The initial traveling direction error is able to be set by using the measurement result of the GPS sensor 340 in the movement start initial stage.

$$X = \begin{bmatrix} \Delta V \\ \Delta A \\ b_a \\ b_g \\ \Delta\psi \\ \Delta\psi^{MV} \\ \Delta R \end{bmatrix} \quad (1)$$

In addition, the error estimation unit 362 sets, for example, an observation vector "$Z_1$" denoted by the following expression (2), and an observation vector "$Z_2$" denoted by the following expression (3) by using predetermined constraint condition based on the traveling direction axis (Step S54).

$$Z_1 = \text{Change Amount in Yaw Angle} \quad (2)$$

$$Z_2 = \begin{bmatrix} \Delta r_R \\ \Delta r_P \\ \Delta r_Q \end{bmatrix} - \begin{bmatrix} \text{Stride} \\ 0 \\ 0 \end{bmatrix} \quad (3)$$

The amount of change that occurs in the yaw angle which is the observation vector "$Z_1$" denoted by the expression (2) described above is obtained as a change in the sensor posture angle on the basis of the local coordinate angular velocity input from the gyro sensor 333. At this time, the coordinate conversion matrix (an LV coordinate conversion matrix) to the movable body coordinate system which is defined in Step S52 and is defined in Step S56 again is calculated from the local coordinate system, and is subjected to the coordinate conversion to the movable body coordinate system. Furthermore, a measurement result of the azimuth direction of the GPS sensor 340 may be used as the amount of change that occurs in the yaw angle. Alternatively, the position calculation device 3 is configured to include an azimuth direction sensor or a geomagnetic sensor, and the measurement result of the azimuth direction of the azimuth direction sensor or the geomagnetic sensor may be used as the amount of change that occurs in the yaw angle.

In addition, in the observation vector "$Z_2$" illustrated in the expression (3) described above, a lower-case character "r" indicates a component of the position vector, and shows an axis of the movable body coordinate system by a subscript. The position vector having $r_R$, $r_P$, and $r_Q$ as a component is a position vector from a movable body coordinate position before one step to the movable body coordinate position, and is obtained after performing the coordinate conversion with respect to the absolute coordinate position input from the inertial navigation arithmetic unit 361 into the movable body coordinate position. Here, the coordinate conversion is performed by using the LV coordinate conversion matrix described above, and the LA coordinate conversion matrix obtained by the inertial navigation arithmetic unit 361 in the inertial navigation arithmetic processing.

In addition, "Stride" indicates a movement distance (a stride length) of one step. The stride length is calculated by the stride length calculation unit 365 in the stride length calculation processing which is started in Step S3 of FIG. 5.

By setting the observation vector "$Z_2$", the error estimation unit 362 applies constraint condition limiting the movement to a direction other than a direction along the traveling direction axis as constraint condition based on the traveling direction axis. In movement such as walking, the constraint condition are based on the assumption that the user 1 does not move in every direction, and the position vector obtained in a short period of time is coincident with the traveling direction.

As described above, when the state vector "X" and the observation vectors "$Z_1$" and "$Z_2$" are set, the error estimation unit 362 performs prediction arithmetic (time update) and correct arithmetic (observation update) on the basis of the Kalman filter theory, and calculates an estimation value (a state estimation value) of the state vector "X" (Step S55). Furthermore, one observation vector (an observation matrix) having each of the observation vectors "$Z_1$" and "$Z_2$" as an element may be used.

After that, the movable body coordinate system setting unit 364 corrects the traveling direction axis by using an estimation value of the amount of change that occurs in the traveling direction obtained in Step S55 and defines the movable body coordinate system again (Step S56), and then returns to Step S53 and repeats the processing.

Figure 5:
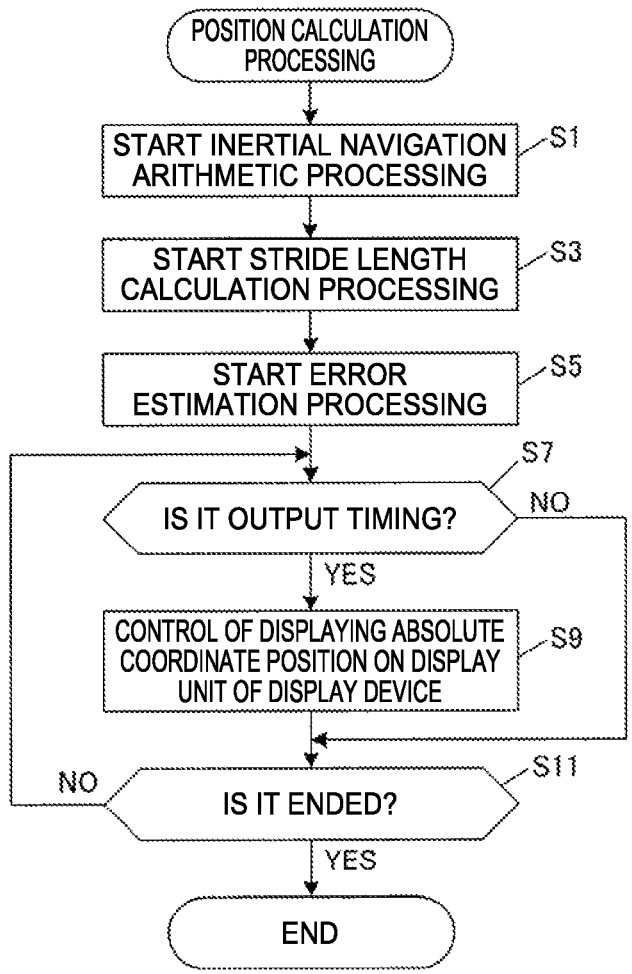
FIG. 5 is a flowchart illustrating a procedure of position calculation processing.

Returning to the description of FIG. 5, subsequently, the arithmetic processing unit 360 determines whether or not it is an output timing of the position, and when it is determined that it is not the output timing (Step S7: NO), the arithmetic processing unit 360 proceeds to Step S11. Then, when it is determined that it is the output timing (Step S7: YES), the arithmetic processing unit 360 performs control of displaying a new absolute coordinate position on the display unit 53 of the display device 5 (Step S9). Here, the processing is performed by transmitting the new absolute coordinate position to the display device 5 through the communication unit 350, by performing map matching processing or the like of the display device 5 which receives the new absolute coordinate position, and by displaying the new absolute coordinate position on the display unit 53.

Then, in Step S11, the arithmetic processing unit 360 determines whether or not to end the processing, and when it is determined to continue the processing (Step S11: NO), returns to Step S7. When it is determined to end the processing (Step S11: YES), the position calculation processing is ended.

Figure 7:
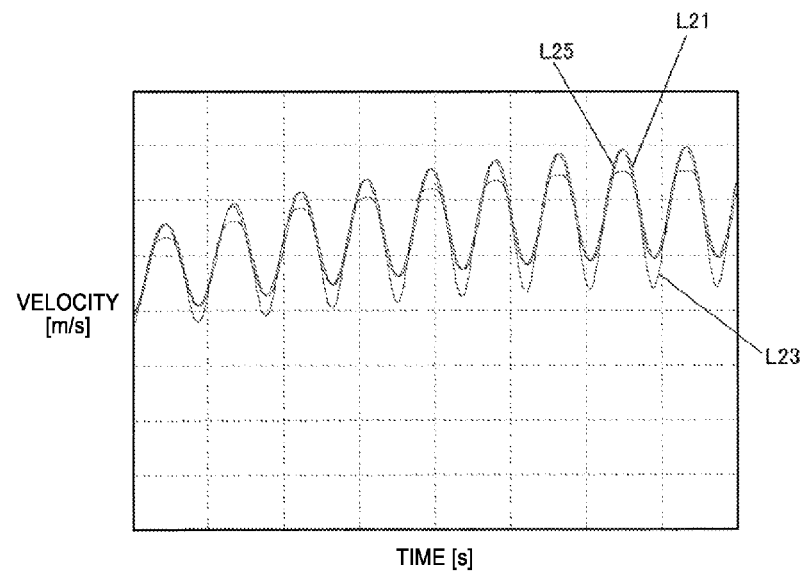
FIG. 7 is a diagram illustrating a result of validating an estimation result of a change in a traveling direction.
Figure 8:
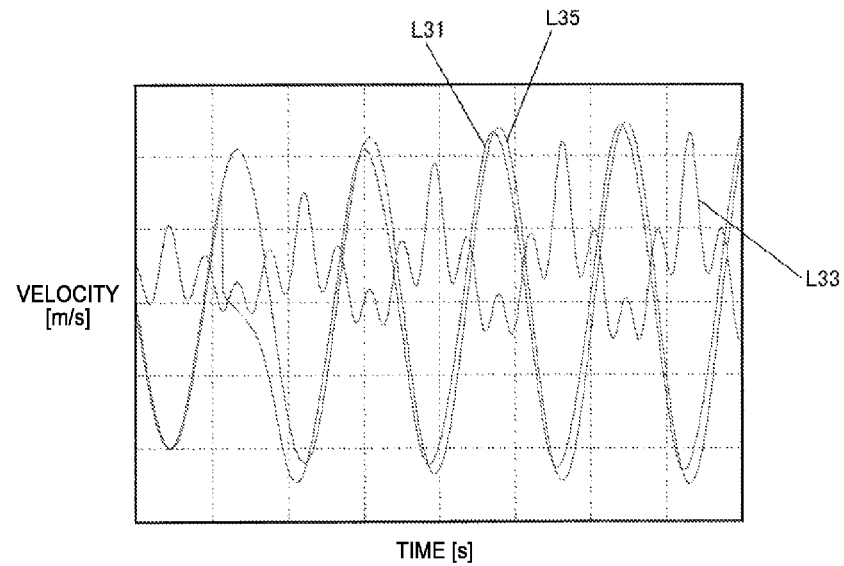
FIG. 8 is a diagram illustrating the other result of validating the estimation result of the change in the traveling direction.
Figure 9:
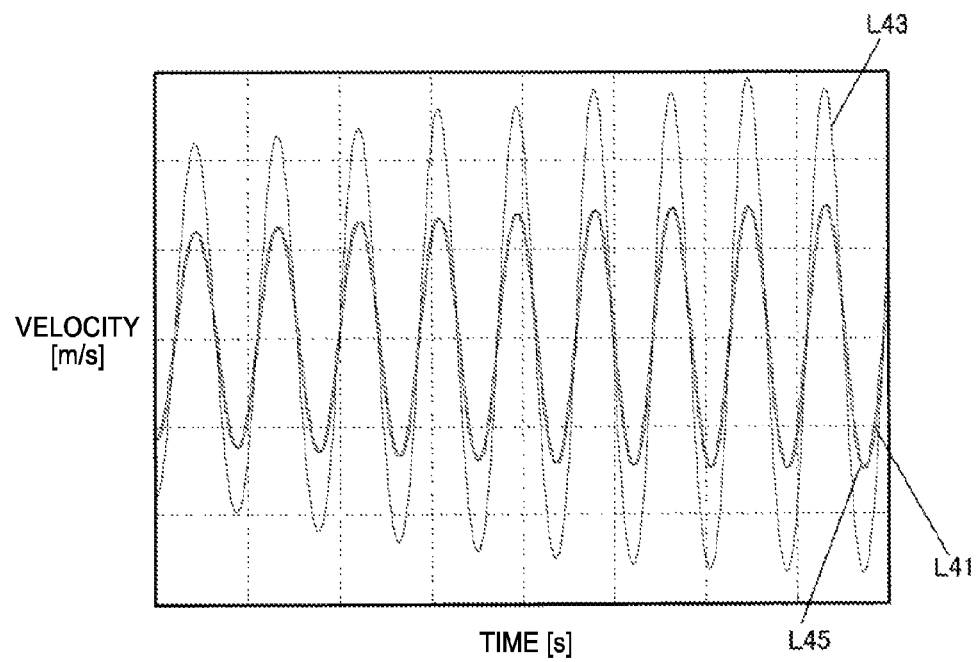
FIG. 9 is a diagram illustrating the other result of validating the estimation result of the change in the traveling direction.

Here, the amount of change that occurs in the traveling direction is estimated by applying this embodiment, the movable body coordinate velocity vector is obtained by a case where the traveling direction axis is corrected (there is estimation), and a case where the traveling direction axis is corrected by using the amount of change that occurs in the yaw angle obtained as a change in the sensor posture angle from the local coordinate angular velocity without estimating the amount of change that occurs in the traveling direction (there is no estimation), and an estimation result of a change in the traveling direction is validated. FIG. 7, FIG. 8, and FIG. 9 are diagrams illustrating a result of the validation. In FIG. 7, both of a time change L21 in a traveling direction component (an R axis component) of the movable body coordinate velocity vector when there is an estimation and a time change L23 in the traveling direction component of the movable body coordinate velocity vector when there is no estimation are indicated as a true value of a time change L25. In addition, in FIG. 8, a case where there is an estimation with respect to a left and right direction component (a P axis component) is illustrated as "L31", a case where there is no estimation is illustrated as "L33", and a case of the true value is illustrated as "L35", and in FIG. 9, a case where there is the estimation with respect to an up and down direction component (a Q axis component) is illustrated as "L41", a case where there is no estimation is illustrated as "L43", and a case of the true value is illustrated as "L45".

As illustrated in FIG. 7, the traveling direction component of the movable body coordinate velocity vector when the amount of change that occurs in the traveling direction is estimated is coincident with the true value, but the traveling direction component of the movable body coordinate velocity vector when traveling direction axis is corrected by using the amount of change that occurs in the yaw angle without estimating the amount of change that occurs in the traveling direction is deviated from the true value. The same applies to a case of the leftward and rightward direction component in FIG. 8 or a case of the up and down direction component in FIG. 9.

As described above, according to this embodiment, it is possible to set the traveling direction axis initially by using the position vector of the movement start initial stage of the user 1 as the initial traveling direction, and to estimate the amount of change that occurs in the traveling direction from the initial traveling direction. In addition, it is possible to estimate the inertial navigation arithmetic error by applying the constraint condition limiting the movement to the direction other than the direction along the traveling direction axis, and to correct the absolute coordinate position, the absolute coordinate velocity vector, and the absolute posture angle by using the estimated inertial navigation arithmetic error. Therefore, it is possible to suitably correct the traveling direction axis without affecting the change in the yaw angle of the body portion of the user 1 according to the movement such as walking or running. Then, an error due to the change in the yaw angle of the body portion is reduced, and thus position calculation is accurately performed.

Figure 10:
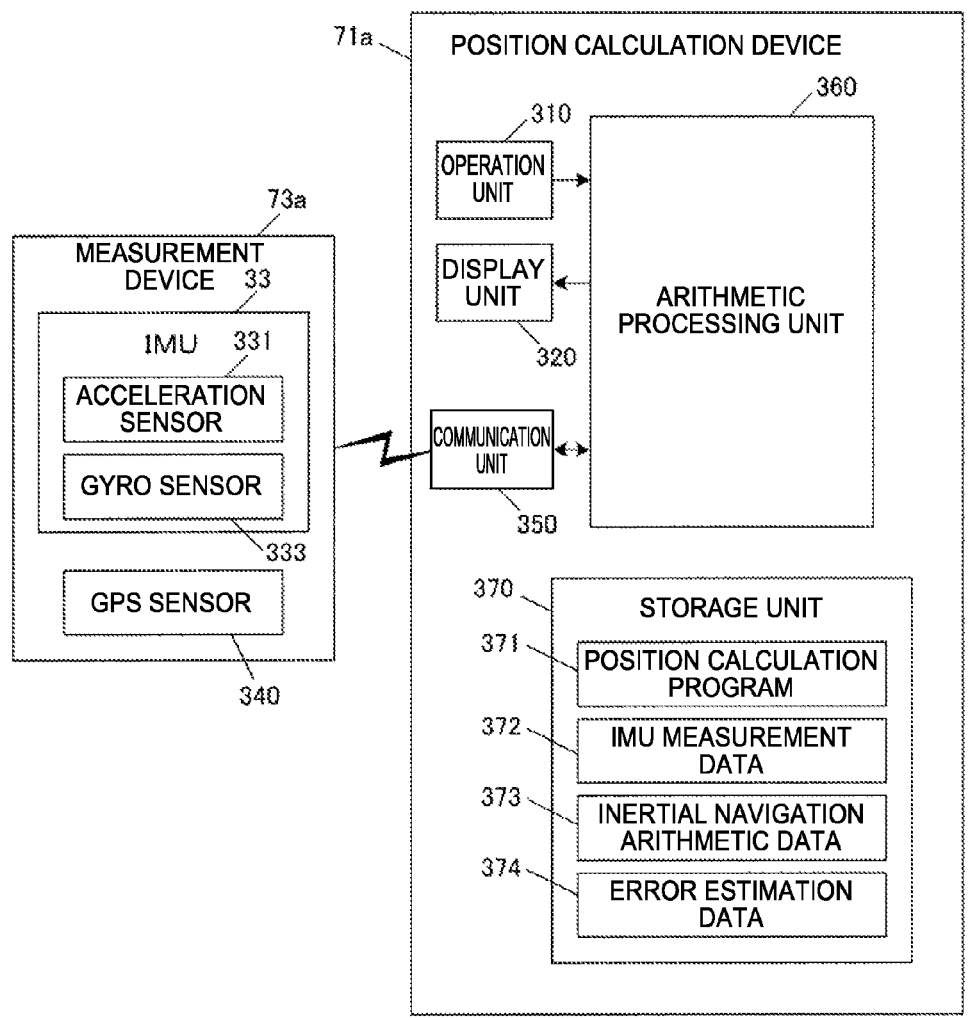
FIG. 10 is a block diagram illustrating a functional configuration example of a position calculation device in a comparative example.

In addition, in the embodiment described above, a system configuration is exemplified in which the position calculation device 3 is separated from the display device 5. In contrast, as illustrated in FIG. 10, the entire system may be configured of a position calculation device 71a and a measurement device 73a. In this comparative example, the position calculation device 71a is used by being mounted on an arm of the user 1 (a right arm or a left arm), the separate measurement device 73a is used by being mounted on the body portion of the user 1 (for example, a right lower back or a left lower back). Furthermore, in FIG. 10, the same reference numerals are applied to the same parts as that of the first embodiment.

The measurement device 73a includes the IMU 33 including the acceleration sensor 331 and the gyro sensor 333, and the GPS sensor 340. The measurement device 73a is configured to transmit and receive data of wireless communication with respect to the position calculation device 71a, and occasionally transmits a measurement result of the IMU 33 or a measurement result of the GPS sensor 340 to the position calculation device 71a.

On the other hand, the position calculation device 71a includes the operation unit 310, the display unit 320, the communication unit 350, the storage unit 370, and the arithmetic processing unit 360. In the storage unit 370, the position calculation program 371, the IMU measurement data 372, the inertial navigation arithmetic data 373, and the error estimation data 374 are stored, similar to the position calculation device 3 of the embodiment described above. In addition, the arithmetic processing unit 360 includes the inertial navigation arithmetic unit 361, the error estimation unit 362, and the stride length calculation unit 365, similar to the configuration of FIG. 4.

The entire disclosure of Japanese Patent Application No. 2014-156115, filed Jul. 31, 2014 is expressly incorporated by reference herein.

What is claimed is:

1. A position calculation method, comprising:
    setting a traveling direction axis of a user by using a detection result of a sensor, wherein a detection result of an acceleration sensor and a detection result of a gyro sensor are included in the detection result of the sensor;
    estimating a change in a traveling direction of the user and correcting the traveling direction axis based on the estimated change in the traveling direction, wherein:
        the correcting includes estimating an amount of change that occurs in the traveling direction of the user from the set traveling direction axis,
        the estimating includes performing correction by using a Kalman filter in which the amount of change that occurs in the traveling direction is set as an element of a state vector and a change in a yaw angle based on the detection result of the gyro sensor is set as an element of an observation vector; and
    calculating a position by using a movement distance in the traveling direction axis and by using the detection result of the sensor.

2. The position calculation method according to claim 1, wherein the calculating the position includes correcting the position by using movement limitation to a direction other than a direction along the traveling direction axis as a constraint condition.

3. The position calculation method according to claim 2, wherein the correcting the position includes performing correction by using a Kalman filter in which an error in the position change is set as an element of a state vector and a position change component to the direction other than the traveling direction axis is set as an element of an observation vector.

4. A position calculation device, comprising:
    a sensor which detects a movement of a user;
    an acceleration sensor which detects an acceleration of the user;
    a gyro sensor; and
    an arithmetic processing unit which executes:
        setting a traveling direction axis by using a detection result of the sensor,
        estimating a change in a traveling direction of the user and correcting the traveling direction axis, wherein:
            the correcting includes estimating an amount of change that occurs in the traveling direction of the user from the set traveling direction axis,
            the estimating includes performing correction by using a Kalman filter in which the amount of change that occurs in the traveling direction is set as an element of a state vector and a change in a yaw angle based on the detection result of the gyro sensor is set as an element of an observation vector, and
        calculating a position based on the detection result of the sensor by using a movement distance in the traveling direction axis.

* * * * *